United States Patent
Kato et al.

(10) Patent No.: US 10,252,930 B2
(45) Date of Patent: Apr. 9, 2019

(54) BENT GLASS PLATE FOR OPTICAL USE AND FABRICATION METHOD THEREOF

(71) Applicant: JAPAN 3D DEVICES CO., LTD., Kashiwazaki-shi, Niigata (JP)

(72) Inventors: Satoshi Kato, Kashiwazaki (JP); Koji Segi, Kashiwazaki (JP); Nobuhiro Maeda, Kashiwa (JP)

(73) Assignee: JAPAN 3D DEVICES CO., LTD., Kashiwazaki-shi, Niigata (JP)

( * ) Notice: Subject to any disclaimer, the term of this patent is extended or adjusted under 35 U.S.C. 154(b) by 336 days.

(21) Appl. No.: 14/819,714

(22) Filed: Aug. 6, 2015

(65) Prior Publication Data
US 2016/0039705 A1 Feb. 11, 2016

(30) Foreign Application Priority Data

Aug. 8, 2014 (JP) .................................. 2014-163167
Aug. 5, 2015 (JP) .................................. 2015-154985

(51) Int. Cl.
C03B 23/03 (2006.01)
C03B 35/14 (2006.01)
C03B 40/00 (2006.01)

(52) U.S. Cl.
CPC ...... *C03B 23/0307* (2013.01); *C03B 23/0302* (2013.01); *C03B 35/145* (2013.01); *C03B 40/005* (2013.01); *Y02P 40/57* (2015.11)

(58) Field of Classification Search
CPC ............ C03B 23/0307; C03B 23/0302; C03B 35/145; C03B 40/005
See application file for complete search history.

(56) References Cited

U.S. PATENT DOCUMENTS

| 3,806,330 A | * | 4/1974 | Martin ................. C03B 23/031 65/158 |
| 8,516,854 B2 | * | 8/2013 | Dejneka ................. C03B 11/07 65/106 |
| 2012/0247155 A1 | * | 10/2012 | Murakami ................ C03B 7/11 65/60.1 |

(Continued)

FOREIGN PATENT DOCUMENTS

JP H3-228840 10/1991
JP H06-144855 5/1994

(Continued)

OTHER PUBLICATIONS

First Office Action from JPO, dated Nov. 16, 2016.

*Primary Examiner* — Queenie S Dehghan
(74) *Attorney, Agent, or Firm* — Yokoi & Co., U.S.A.; Toshiyuki Yokoi (57) ABSTRACT

With conventional bent glass plates and fabricating method thereof, it has been difficult to fabricate bent glass plates with high productivity while achieving both high shape precision and high surface smoothness. According to the present invention directed to a glass plate with 2 mm or less thickness, a bent glass plate for optical use with a shape precision PV value of 50 µm or less and a surface roughness Ra value of 5 nm or less was achieved by appropriately controlling the temperature of the glass plate, the temperatures of upper and lower press dies, and the press pressure; and quickly and uniformly cooling the glass plate to a predetermined temperature.

4 Claims, 3 Drawing Sheets

(56) References Cited

U.S. PATENT DOCUMENTS

| | | | | |
|---|---|---|---|---|
| 2013/0327094 A1* | 12/2013 | Urai | ................... | C03B 11/122 |
| | | | | 65/66 |
| 2014/0065366 A1 | 3/2014 | Joubaud | | |
| 2014/0335322 A1* | 11/2014 | Luo | ................... | C03B 23/0307 |
| | | | | 428/177 |
| 2015/0107305 A1* | 4/2015 | Wei | ................... | C03B 23/0307 |
| | | | | 65/104 |

FOREIGN PATENT DOCUMENTS

| | | | | |
|---|---|---|---|---|
| JP | H06-219759 | 8/1994 | | |
| JP | H9-235123 | 9/1997 | | |
| JP | H10-504274 | 4/1998 | | |
| JP | 2000-16822 | 1/2000 | | |
| JP | 2001-89172 | 4/2001 | | |
| JP | 2003095673 A * | 4/2003 | .......... | C03B 11/122 |
| JP | 2003-160346 | 6/2003 | | |
| JP | 2012-116722 | 6/2012 | | |
| JP | 2013-536795 | 9/2013 | | |

* cited by examiner

BENT GLASS PLATE FOR OPTICAL USE AND FABRICATION METHOD THEREOF

CROSS REFERENCE TO RELATED APPLICATIONS

This application claims priority to Japanese Patent Application Ser. No. 2015-154985, filed on Aug. 5, 2015, which claims priority to Japanese Patent Application Ser. No. 2014-163167, filed on Aug. 8, 2014.

FIELD OF THE INVENTION

The present invention relates to a bent glass plate for optical use and a fabrication method thereof, wherein the bent glass plate is obtained by press-molding a thin plate-like glass member. According to the present invention, the bent glass plate is obtained with high yield, having a bent shape with high precision and a smooth surface with minimal roughness.

BACKGROUND

Bent glass plates are used for, for example, building windows, handrails, partitions and show windows as well as vehicle windshields, door glasses, side view mirrors, and so on. In recent years, bent glass plates have been used for more advanced applications. For example, in a head-up display for vehicles, a concave mirror made of a bent glass plate coated with a reflective film is used as an optical component for magnifying and projecting liquid crystal display images onto a windshield. Furthermore, bent glass plates are used as cover glass in some smartphones.

Compared to glass plates conventionally used as glass panes for buildings or vehicles, bent glass plates for head-up display concave mirrors and smartphone cover glass, among others, are small in dimension, but their requirements are far more demanding in terms of for example, accuracy in size, thickness and shape as well as smoothness and optical homogeneity. This is due to the needs to display accurate and high-precision images; visually recognizable images must contain a large amount of information with high resolution. Thus, any method of fabricating bent glass plates for use for smartphone cover glass or head-up display concave mirrors must meet more strict precision standards than those for conventional applications.

Methods of press-molding a glass member may be generally classified into two groups. One method is the "direct press method," in which raw glass material is melted, defoamed and homogenized; while being still hot, the molten glass flowing out of a circular tube feeder is cut and divided into chunks, each having a predetermined volume, and each of the chunks is pressed with dies to form an intended shape. The other method is the "reheat press method," in which a glass material is precut into a predetermined volume in order to prevent the glass material from having more than required surface area relative to its volume; then, the cut glass material is reheated and softened to a predetermined viscosity to be press-molded into its intended shape.

In the direct press method, it is possible to utilize the heat added to melt the raw glass material to also press-mold the material; therefore, this method has a characteristic of offering high energy efficiency. In this method, however, the molten glass during the pressing operation needs to be kept at a high temperature, because of the reasons that the molten glass needs to be cut into chunks each having a predetermined volume while being hot, and the molten glass needs to reach a suitable viscosity for flowing out of the feeder with a predetermined flow rate (the suitable viscosity is generally lower than an optimal viscosity for shaping), among other reasons. As a result, it becomes difficult to produce molded articles with high precision due to high thermal contraction of the glass member while cooling down to ambient temperature after the press molding. Therefore, the direct press method is unsuited for fabricating a bent glass plate with high-precision shape.

The reheat press molding of a glass member is a method comprising steps of placing the glass member on a ring-shaped holding die, e.g., a ceramic block called air floating bed or the like, heating die glass member to the glass softening temperature in a furnace, and pressing the glass member with press dies to bend and form the glass member. Since the glass member originally at ambient temperature is heated and softened in this method, the energy efficiency is lower than that generally attained in the direct press method. However, the glass does not need to be softened to low viscosity (that is, the glass can be press-molded at a low temperature) in the direct press method. Therefore, the thermal contraction after molding while cooling down to ambient temperature is smaller compared to the direct press method, thereby enabling to obtain a molded article with high-precision dimensions.

When a typical reheat press method is used with a glass chunk having a small surface area to create a glass member with a shape having a large surface area relative to its volume, the glass member's temperature drops due to rapid heat exchange with the press dies as the surface area of the glass member increases during its molding process; thus, its viscosity quickly increases due to the temperature drop. Accordingly, the viscosity may inevitably increase to a degree that plastic deformation becomes difficult before the predetermined shape is achieved. That is, there is a limit to moldability. A similar problem occurs for the case of using the direct press method as well.

Thus, in the case where it is impossible to mold a glass member with a large surface area relative to its volume by using the conventional reheat press method, in particular, in the case where it is desirable to mold a thin plate-like glass member with a uniform thickness, two molding methods are typically employed: the bending and forming method, and the thin plate press molding method.

Bending and Forming Method:

In the bending and forming method, a flat glass plate that is sufficiently smooth is heated and softened while its lower surface is in contact with a die (also called a mold) to bend and form the glass plate conformal to the die surface shape by relying on the glass plate's own weight, or using vacuum suction force and the like, in the case of using the glass plate's own weight, the glass plate is placed on top of a die that was pre-formed to the glass plate's final shape, and the glass plate is heated to a high enough temperature to deform with its own weight to attain a predetermined bent shape.

In order to prevent the glass plate from deforming away from the predetermined shape after releasing from the die, the molded article is first cooled on the die to a temperature lower than the glass plate's strain point, and then, released from the die. In this case, the glass plate and the die are in contact for an extended period of time; in order to prevent any die marks on the glass plate surface in contact with the die, there is disclosed a method including interposing a heat-resistant sheet between the die and the glass plate (see JP P2012-116722A).

In the bending and forming method, a die material is not required to be very strong since the difference in temperature between the glass and the die is not large, and since the stress applied to the die is not large. Rather, inexpensive and easy-to-process ceramics with sufficient fire resistance, such as diatomite, are often used in multiple for achieving high productivity.

Thin Plate Press Molding Method:

The thin plate press molding method is a reheat press method used for thin plate-like glass members. Similar to the aforementioned bending and forming method, in the thin plate press molding method, a flat glass plate is used, which is sufficiently smooth and has the same thickness as the final product. The glass plate is heated until it has a predetermined viscosity, and then is pressed by applying a pressure with press dies. In many instances, in order to mitigate the worsening of surface roughness, the glass plate is heated to a predetermined temperature, softened and processed with weight bending while being placed on a heat-resistant fiber sheet. Thereafter, press-molding is carried out with the heat-resistant fiber sheet interposed between the upper press die and the glass plate (see JP A2003-160346).

In order to see high-resolution characters and images on a small display of a smart phone, for example, cover glass with no distortion and an extremely smooth surface is required. Considerations for future products include, for example, curving the surface of smartphone display in order to make it easier to see and handle, or deeply folding the cover glass periphery in order to increase the effective area of the display. Similarly, concave mirrors for magnified projection for vehicle-mounted head-up displays are required to be molded into an accurate shape in compliance with design parameter values, and to have an extremely smooth surface for accurately projecting images.

Shape precision of concave mirrors for head-up displays or smartphone cover glass is represented by a PV value. The PV value is a maximum shape error with respect to a design parameter value for the curved shape of a molded, bent glass plate, and is expressed based on a difference between the highest point (peak) and the lowest point (valley) in the measured range. It is required to be 50 µm or less. When the PV value exceeds 50 µm, images viewed through the cover glass or straight lines in characters and images projected on the windshield become distorted due to the excess curvature.

As for surface roughness, the surface irregularity is represented by the arithmetic average of roughness, Ra (as stipulated by JIS B0601). Smoothness of Ra≤5 nm is required. The Ra value exceeding 5 nm corresponds to the irregularity exceeding 10 nm. In this case, corner portions of characters and images become blurry and unclear; hence, the image resolution deteriorates.

Although smartphones with curved cover glass have been put into practical applications to some extent, the technology is not optimized and the research and development are still in progress to achieve precision molding for fabricating such smartphone cover glass, which can meet the requirements for the aforementioned shape precision and surface smoothness. As for a head-up display, the size of concave mirrors needs to be increased while maintaining shape precision and smoothness in order to display images on the entire automobile windshield. A suitable technology has yet to be identified at present.

In the bending and forming method, the upper surface of the glass plate does not contact with another thing, so that the glass plate member can be molded with the smoothness of at least its upper surface uncompromised. However, if there is any portion with a small curvature radius (e.g., the portion being deeply bent) required in the molded article, it becomes difficult to achieve the curvature solely by the glass plate's own weight, and thus the glass surface will not fully take the die shape. When such deep bending is required, a vacuum suction force, for example, is needed to bend the glass plate so that its lower surface will take the die surface shape. It is still difficult, however, to configure a die structure and a bending method that enables the application, of vacuum suction force over the entire glass plate surface. Furthermore, it is still difficult to mold the glass plate into its intended shape using only the glass self-weight and/or the vacuum suction force.

In the bending and forming method, the die contacting the lower surface of the glass plate member needs to be heated to a temperature near the softening point of the glass plate, and further after the molding, the die needs to be cooled to a temperature lower than, the strain point with the glass plate placed thereon to suppress the deformation. Thus, each cycle takes a long time, making it difficult to ensure sufficient productivity unless many molding dies are used at a time.

On the other hand, in the conventional thin plate press molding method discussed above, it should be possible to achieve even a small curvature radius of the glass plate since the glass plate heated to a temperature that enables plastic deformation can be formed into a predetermined shape defined by a pair of upper and lower dies. Unlike the bending and forming method, in the conventional thin plate press molding method, both the upper and lower surfaces of the glass plate will contact with the press dies under a predetermined press pressure. As a result, it is difficult to prevent the press dies' surface roughness from being substantially transferred to the molded glass article unless a heat-resistant fiber sheet or the like is interposed.

When a heat-resistant fiber sheet is interposed for reducing the surface roughness, the heat conduction between the press dies and the glass plate will be substantially compromised. Thus, in order for the temperatures of the press dies and the glass plate to be substantially equal, the press dies and the glass plate need to be kept in a pressed state for an extended period of time. With this restriction, as in the case of using the bending and forming method, each cycle takes a long time, and sufficient productivity cannot be ensured with a small number of press dies.

It may be contemplated to reduce the surface roughness of the press die to reduce the surface roughness of the bent glass plate. However, it is considered to be practically impossible to polish the press die surface to the surface roughness of 10 nm or less, and therefore, it is difficult to achieve a high smoothness of 10 nm or less for bent glass plates by only reducing the press die surface roughness.

DETAILED DESCRIPTION

To solve the problems associated with the aforementioned bending and forming method and the thin plate press molding method, the present inventors developed high-precision bent glass plates for optical use and a fabrication method thereof by using glass plates with a thickness of 2 mm or less. Based on the present fabrication method, the bent glass plate with high-precision shape and superb surface smoothness is achieved with high productivity.

Figure 1:
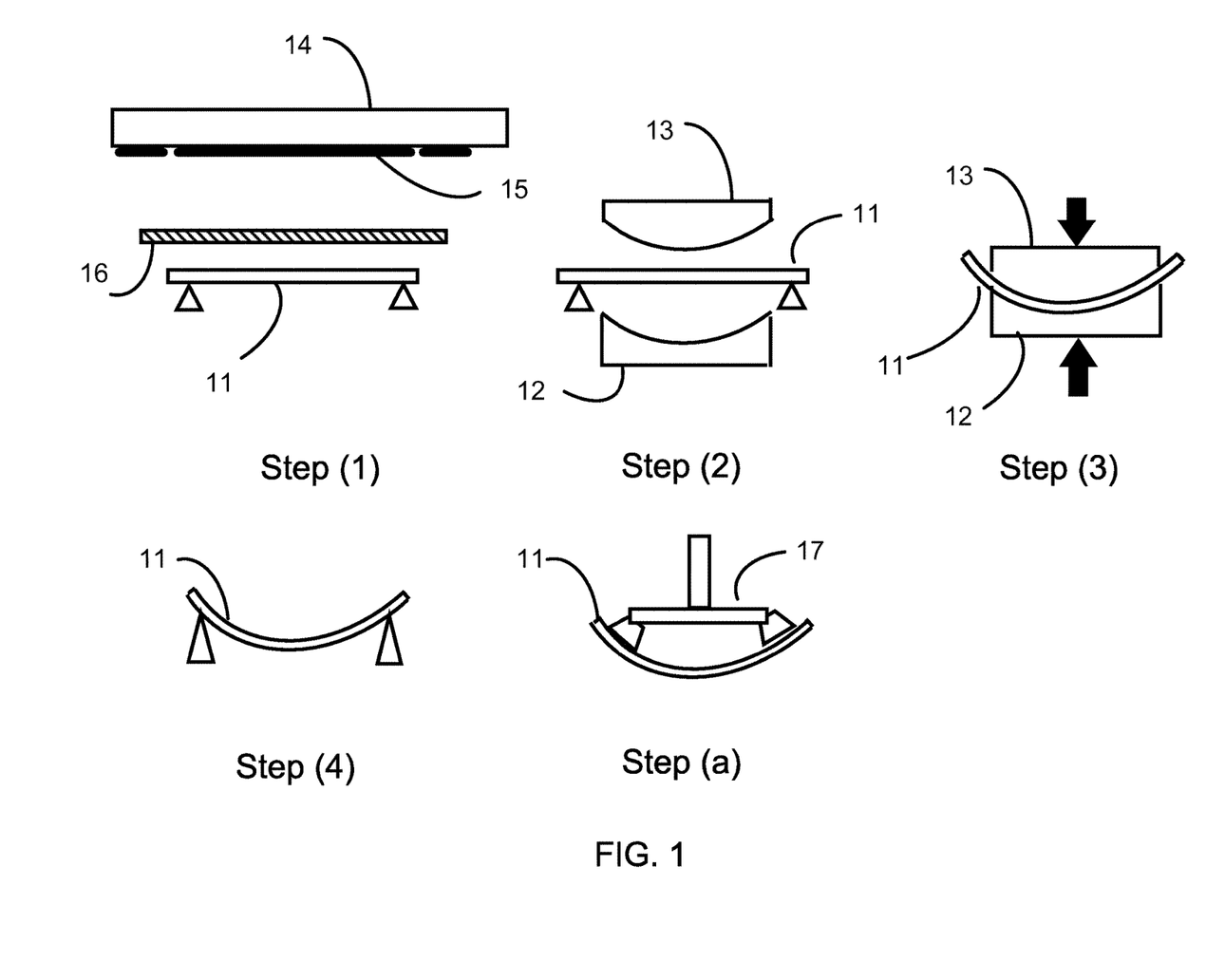
FIG. 1 is a process diagram schematically illustrating a method of fabricating a bent glass plate according to an embodiment.

FIG. 1 is a process diagram schematically illustrating a method of fabricating a bent glass plate according to an embodiment. Shown in FIG. 1 are a glass plate 11, a lower press die 12, an upper press die 13, a hot plate 14, a heating wire 15 and a soaking plate 16. In step (1), the soaking plate 16 may be used between the glass plate 11 and the heating wire 15. In step (2), the press dies 12 and 13 are preheated to a predetermined temperature with a heater embedded in the dies (not shown). In step (3), pressure is applied to the glass plate 11 by the press dies 12 and 13 from upward and downward directions, as indicated by arrows. In step (4), the glass plate 11 that has been bent is released from the press dies 12 and 13 and cooled down under ambient conditions. In step (a), the glass plate 11 is transferred to a distortion removing device 17 after the completion of bending and forming.

Figure 2:
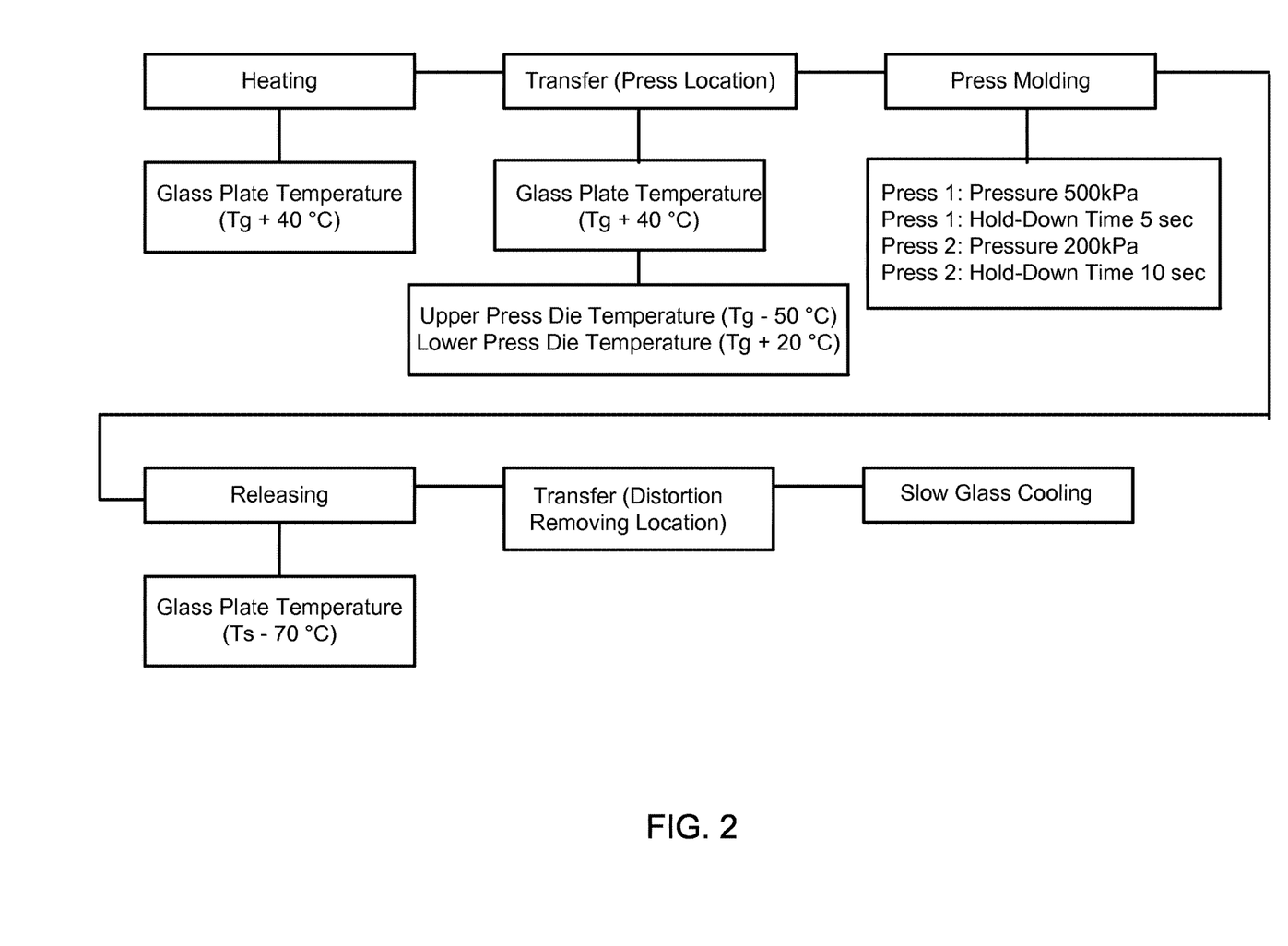
FIG. 2 is a block diagram illustrating the present fabrication method according to an embodiment.

FIG. 2 is a block diagram illustrating the present fabrication process according to an embodiment. In this figure, example values of the process parameters such as temperature, pressure and press time (hold-down time) are also described correspondingly to the above steps.

The present invention provides a bent glass plate for optical use characterized in that a glass plate with a thickness of 2 mm or less is heated to a glass transition temperature (Tg) or higher, and press-molded by a pair of preheated press dies rather than by the glass plate's own weight to transfer the surface shapes of the pair of press dies to the glass plate to thereby produce the bent glass plate. The resultant bent glass plate has a PV value of 50 μm or less and a Ra value of 5 nm or less, wherein the PV value represents shape precision and the Ra value represents surface roughness.

As illustrated in FIGS. 1 and 2, the present invention further provides a method of fabricating a bent glass plate for optical use by press-molding a glass plate with, a thickness of 2 mm or less, which is cut into predetermined dimensions, the method comprising steps of:
  (1) heating the glass plate 11 to a temperature in a range of higher than or equal to the glass plate's glass transition temperature (Tg) and lower than or equal to (Tg+50° C.);
  (2) inserting the glass plate 11 between a pair of upper and lower press dies 12 and 13 preheated to a temperature in a range of higher than or equal to (Tg−50° C.) and lower than or equal to (Tg+20° C.);
  (3) press-molding the glass plate 11 inserted at a predetermined position between the press dies 12 and 13 by applying a press pressure in a range of higher than or equal to 10 kPa and lower than or equal to 800 kPa per unit, area; and
  (4) releasing the press-molded glass plate 11 from between, the press dies 12 and 13 and cooling the press-molded glass plate to a temperature of (Ts−70° C.) or lower under ambient conditions, wherein Ts is a strain point of the glass plate,
to produce the bent glass plate for optical use with a PV value of 50 μm or less and a Ra value of 5 nm or less, wherein the PV value represents shape precision and the Ra value represents surface roughness.

In the press molding of step (3), the present fabricating method may not use a heat-resistant fiber sheet, for example, between the press dies and the glass plate although conventional techniques often use such an interposed member.

In fabricating the bent glass plate for optical use by press-molding a glass plate, the present method uses the glass plate cut into predetermined dimensions with a thickness of 2 mm or less. One of the reasons why the present method is directed to a glass plate with a thickness of 2 mm or less is that, in general, glass plates with a thickness of 2 mm or less are used as glass substrates for smartphone cover glass and head-up display concave mirrors. Another reason is that, when a bent glass plate is fabricated from a glass plate by the press molding method, the thicker the glass plate is, the higher press pressure is required, making it difficult to achieve high-precision shape and smooth surface.

In the present method, it is preferable that the glass plate periphery is polished. This is because when cutting the glass plate, blemishes, which often lead to the glass plate damage, may occur especially in the glass plate periphery. Special polishing is unnecessary; commonly employed edge chamfering, general edge flat polish, and other techniques are sufficient. If an unpolished glass plate is supplied to subsequent processes, a heat shock caused by a sudden temperature change may damage the glass plate.

In the present method, the glass plate is heated in step (1). Before the press molding, the glass plate needs to be heated to a temperature in the range of higher than or equal to the glass plate's glass transition temperature (Tg) and lower than or equal to (Tg+50° C.). The glass transition temperature (Tg) is a temperature at which the glass changes from, a solid state, that is, supercooled state to a liquid state. In step (1), the glass plate is preheated to a temperature suited for precise molding.

If the temperature of the glass plate is lower than its glass transition temperature, Tg, the pressure applied during the press molding may not be diffused by the glass deformation, and may exceed a breaking strength to cause a crack in and destruction of the glass plate. Conversely, if the temperature of the glass plate is higher than (Tg+50° C.), the surface of the glass plate becomes easily deformed, thus readily receiving the surface roughness of the press dies, unable to attain high smoothness. Additionally, the glass plate will be more susceptible to thermal contraction, leading to distortion after being released from the press dies, unable to attain high-precision shape.

It is preferable that the glass plate temperature is in the range of higher than or equal to (Tg+10° C.) and lower than or equal to (Tg−35° C.) before the press molding. This is because a risk that the glass plate is damaged during the press molding, a risk that the press dies' surface roughness is transferred to the glass plate, and a risk that the glass plate distorts due to its thermal contraction after being released from the press dies, are all reduced, allowing for reliable production of high-quality bent glass plates for optical use.

In the present method, the glass plate, pre-heated in the step (1), is inserted at a predetermined position between a pair of upper and lower press dies for press-molding. The predetermined position is a position where the glass plate covers an entire recess of the lower die. In this case, the respective centers of the recess and the glass plate must be aligned so that the entire recess is covered. If those centers are misaligned, the glass plate's bent shape may become unacceptably distorted.

Before the press molding, the press dies needs to be preheated to a temperature in the range of higher than or equal to (Tg−50° C.) and lower than or equal to (Tg+20° C.) in the preset method. If the press-die temperature is lower than (Tg−50° C.), the press dies will absorb heat from the glass plate within a short period of time, and as a result, the plastic deformation of the glass plate will become difficult before it attains its intended shape, whereby the glass plate may even be destroyed by the press pressure. Conversely, if the press-die temperature is higher than (Tg+20° C.), the surface roughness of the press dies will be easily transferred to the glass plate, causing so-called orange peel (a pattern resembling the orange skin surface). Additionally, due to the high heat during the press molding, the glass plate surface may adhere to the press dies and may not come off easily. It is preferable that the press dies are preheated to a temperature in the range of higher than or equal to (Tg−30° C.) and lower than or equal to (Tg+20° C.). This is because the risks described above will be further reduced, allowing for reliable production of high-quality molded articles.

In the present method, the press pressure in step (3) is in the range of higher than or equal to 10 kPa and lower than or equal to 800 kPa. If the press pressure exceeds 800 kPa, the PV value, which represents shape precision, may be maintained at a good level of about 25 μm, but the surface roughness Ra undesirably exceeds that of the press dies. Additionally the press die surface may prematurely deteriorate. Conversely, if the press pressure is below 10 kPa, the pressure control becomes unstable, and the molding precision worsens drastically.

In the present method, the press dies are configured to apply the press pressure to the glass plate for longer than 10 seconds. This is to ensure the surface contact and the heat exchange via heat conduction between the press dies and the glass plate. If the press time is shorter than 10 seconds, sufficient heat exchange does not occur between the press dies and the glass plate, and the glass plate is susceptible to plastic distortion after being released from the press dies, resulting in an elevated risk that its PV value undesirably exceeds 200 μm, even though surface roughness of 5 nm or less may be achieved. Conversely, if the press time exceeds 30 seconds, the glass-plate temperature decreases so much that the glass plate may possibly break before the end of the press time. Additionally, the productivity declines with the prolonged molding cycle.

In the present method, in step (4), the glass plate is released from the press dies after the press molding, and cooled. The cooling does not need to be carried out using a special furnace; after being released from between the press dies, the glass plate is quickly cooled to a temperature of (Ts−70° C.) or lower under ambient conditions that should be kept as uniform and constant as possible, if the cooling is insufficient and uneven, the shape molded by the press dies may change due to the physical handling force or glass plate's own weight, for example. Additionally, thermal contraction may become different from position to position in the glass plate. Here, Ts is a strain point of the glass plate, wherein the strain point is defined as the temperature below which any distortions left in the glass cannot be removed. There is a possibility that some distortion may remain within the bent glass during the cooling process, but this is not a problem since the distortion can be removed later at a temperature higher than Ts using a slow cooling furnace.

In the present method, the press pressure needs to be within the range discussed above, but it is preferable that, the press pressure is controlled separately during a first half molding period and a second half molding period. Alternatively, the second half molding period may be further divided into two stages, wherein one pressure is applied during the mid-molding period and a different pressure is applied subsequently. Two or more different press pressures are applied, respectively, when the temperature is in a range where the glass plate can plastically deform and when the temperature is in another range where the glass plate is cooled and can no longer plastically deform. In this way, excess press pressure is not applied to the glass plate when the temperature is in the range where no plastic deformation is possible, thereby preventing imperfections from occurring in the molded glass article.

For example, during the first half molding period, a press pressure in the range between 100 kPa and 500 kPa may be applied for 5 seconds, and subsequently, another press pressure in the range between 10 kPa and 100 kPa may be applied for 10 seconds. More specifically, as in the example illustrated in FIG. 2, the press pressure of 500 kPa may be applied for 5 seconds during the first half molding period, and the press pressure of 200 kPa may be applied for 10 seconds during the second half molding period. In another example, the press pressure of 100 kPa may be applied for 5 seconds during the first half molding period, and the press pressure of 50 kPa may be applied for 10 seconds during the second half molding period. When the press molding is performed as above, the glass plate yield increases with excellent precision moldability wherein the shape precision is 50 μm or less and the surface roughness is 5 nm or less. This is achieved by applying a relatively high pressure for a shorter time during the first half period, and applying a relatively low pressure for a longer time during the second half period to thereby enhance the shape precision and surface smoothness, as well as to reduce cracks in the glass plate.

For a base material of the press dies, a metal with high thermal conductivity, such as steel, is preferred, since the press dies need to have high strength for enduring a load (pressure) during the press molding, while maintaining good heat exchangeability with glass. Additionally, the press die surface may be coated or processed for enhancing its oxidation resistance, mechanical durability against the press pressure, and so on.

Deterioration in flatness of the glass plate may occur, because non-uniform intensities of thermal radiation from the heat source often result in difference in thermal expansion at different points in the glass plate during its temperature rise. To prevent such deterioration, it is effective to provide a refractory soaking plate (e.g., silicon carbide sintered body) which has an area about 30% larger than that of the glass plate surface, in parallel with the glass plate between the heat source and the glass plate. By using the soaking plate, the entire glass plate may be heated to a uniform temperature, resulting in enhanced shape precision and surface smoothness with good reproducibility in the molding process.

As described in detail, this document discloses a bent glass plate for optical use and a fabrication, method thereof characterized in that a bent glass plate with the PV value of 50 μm or less and the Ra value of 5 nm or less is attained, by controlling the glass heating temperature, the press die preheating temperature, the press time and the press pressure, and utilizing the soaking plate. With the shape precision and the surface roughness less than or equal to the above values, respectively, a bent glass plate and a fabrication method thereof are provided herein for applications such as smartphone cover glass and head-up display concave mirrors.

According to the present method, the Ra value of 5 nm or less can be achieved without sacrificing the smoothness of the glass plate attained before its press molding, even when the press molding is done using press dies with the surface roughness Ra of 10 nm or more (e.g., 13 nm) on arithmetic average. The maximum shape error of a curved shape of a press-molded bent glass with respect to its design parameter value may be represented by a PV value, which is a difference between the highest point (peak) and the lowest point (valley) in the measured range. The maximum shape error can be reduced to 50 μm or less according to the present method.

The present method is carried out in a working atmosphere with a generally ambient temperature, wherein the bent glass molded article is quickly released from the press dies after its press molding to be cooled in the working atmosphere with the generally ambient temperature to produce a bent glass plate for optical use. One cycle time of 30 seconds or less is achieved by using one pair of press dies in this process, leading to high productivity per one pair of press dies.

As a result, bent glass plates for use for smartphone cover glass or head-up display concave mirrors can be fabricated inexpensively with high productivity, high shape precision with a PV value ≤50 μm and low surface roughness ≤5 nm.

Figure 3:
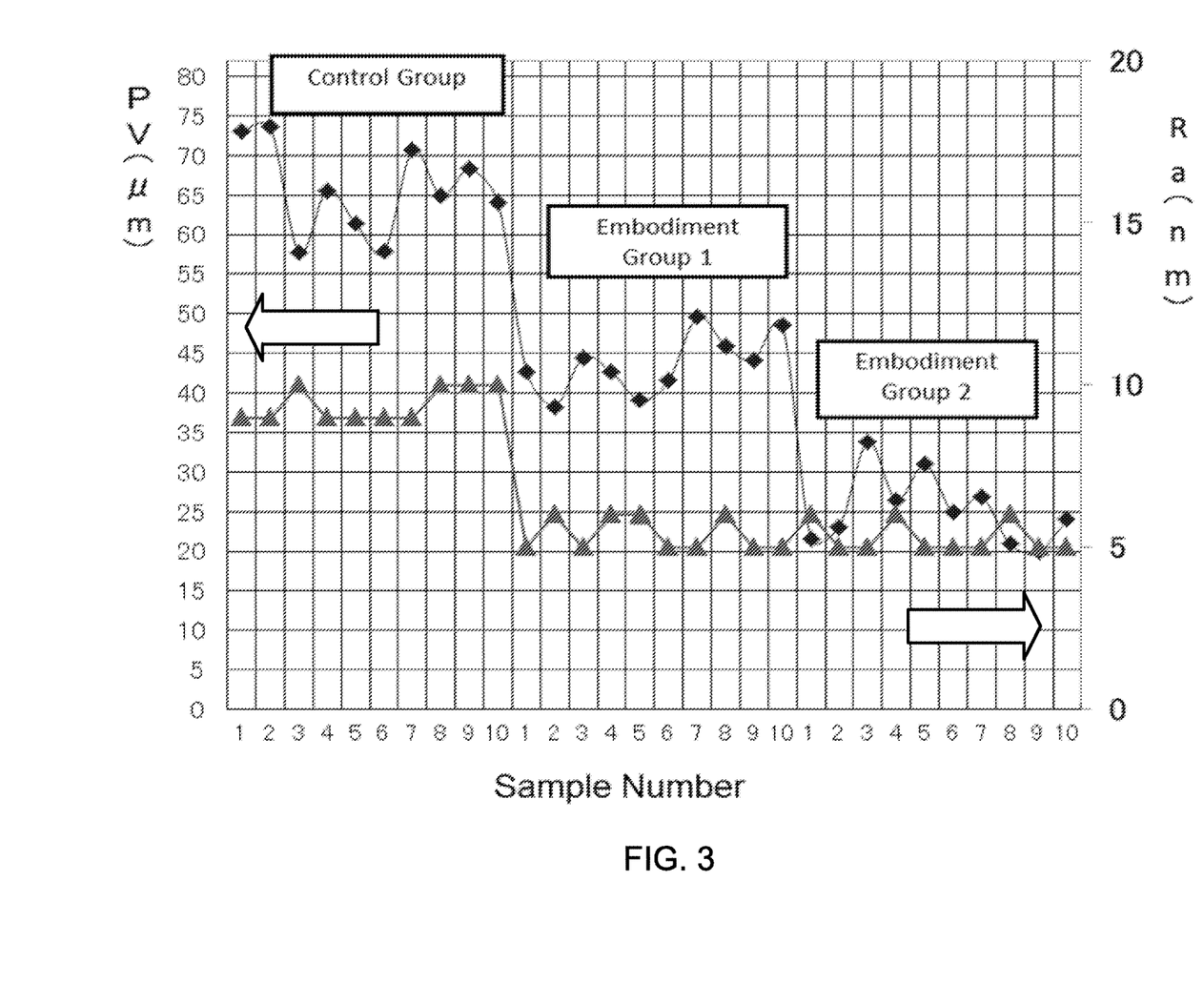
FIG. 3 is a graph depicting the shape precision and surface roughness of each sample.

Embodiments according to the present invention are described in detail below. For convenience, preparation of a control group is described first. Under the same conditions for all groups, 10 bent glass plates for each of the control group, embodiment group 1 and embodiment group 2 were fabricated, and shape precision in PV and surface smoothness (surface roughness) in Ra for each sample were measured. The results are summarized in Table 1. FIG. 3 is a graph depicting the shape precision and surface roughness of each sample.

strain point of this soda-lime glass plate are 560° C. and 510° C., respectively. The periphery of each glass plate was polished using an edge-dressing machine. The glass plate was heated in a heating furnace with the periphery being held horizontally by a ceramic supporting tool, the periphery not being part of a final product. A ceramic hot plate was used as a heat source of the heating furnace, wherein the ceramic hot plate has a size of 300 mm in length and 170 mm in width. The ceramic hot plate surface includes grooves, each having a generally semi-circular cross-sectional shape for holding a heating wire. One type of iron chromium heating wires was attached on the ceramic hot plate. No soaking plate was used for this group.

Electric currents with a same amount were applied respectively to the heating wires provided on the hot plate, and adjusted so that the temperature of the hot plate surface reaches 900° C. When the glass temperature reached about 600° C. (i.e., Tg+40° C.), the glass plate was transferred to between a pair of upper and lower press dies situated next to the hot plate. There is a heater (not shown in FIG. 1) embedded inside each of the press dies, and by applying electric currents in advance, the upper and lower press dies were preheated to 590° C. (i.e., Tg+30° C.) and 550° C. (i.e., Tg−10° C.), respectively, prior to a pressing operation. After being transferred, the glass plate was quickly press-molded under a pressure of 1000 kPa for 5 seconds, held under a reduced pressure of 500 kPa for 10 seconds, and then

TABLE 1

| Examples | Sample Number | Surface Roughness (nm) | Shape Precision (μm) | Press Conditions | | | | Glass Plate Temp (° C.) | Press Die Temp | |
|---|---|---|---|---|---|---|---|---|---|---|
| | | | | Pressure 1 kPa | Time sec | Pressure 2 kPa | Time kPa | | Upper Die (° C.) | Lower Die (° C.) |
| Control Group | 1 | 9 | 73.1 | 100 | 5 | 500 | 10 | 600 | 590 | 550 |
| | 2 | 9 | 73.6 | | | | | | 588 | 550 |
| | 3 | 10 | 57.7 | | | | | | 588 | 549 |
| | 4 | 9 | 65.6 | | | | | | 588 | 549 |
| | 5 | 9 | 61.4 | | | | | | 587 | 549 |
| | 6 | 9 | 57.8 | | | | | | 588 | 549 |
| | 7 | 9 | 70.7 | | | | | | 588 | 549 |
| | 8 | 10 | 64.9 | | | | | | 587 | 549 |
| | 9 | 10 | 68.3 | | | | | | 588 | 550 |
| | 10 | 10 | 64.1 | | | | | | 588 | 550 |
| Embodiment Group 1 | 1 | 5 | 42.7 | 500 | 5 | 200 | 10 | 590 | 576 | 552 |
| | 2 | 4 | 38.3 | | | | | | 575 | 551 |
| | 3 | 5 | 44.5 | | | | | | 575 | 556 |
| | 4 | 4 | 42.6 | | | | | | 576 | 555 |
| | 5 | 4 | 39.1 | | | | | | 576 | 554 |
| | 6 | 5 | 41.6 | | | | | | 576 | 554 |
| | 7 | 5 | 49.6 | | | | | | 576 | 556 |
| | 8 | 4 | 45.9 | | | | | | 577 | 554 |
| | 9 | 5 | 44.1 | | | | | | 576 | 555 |
| | 10 | 5 | 48.6 | | | | | | 577 | 555 |
| Embodiment Group 2 | 1 | 4 | 21.5 | 100 | 5 | 50 | 10 | 580 | 569 | 557 |
| | 2 | 5 | 23.1 | | | | | | 570 | 557 |
| | 3 | 5 | 33.8 | | | | | | 571 | 558 |
| | 4 | 4 | 26.4 | | | | | | 571 | 558 |
| | 5 | 5 | 31 | | | | | | 569 | 558 |
| | 6 | 5 | 24.9 | | | | | | 571 | 559 |
| | 7 | 5 | 26.9 | | | | | | 570 | 559 |
| | 8 | 4 | 20.9 | | | | | | 571 | 560 |
| | 9 | 5 | 20 | | | | | | 571 | 559 |
| | 10 | 5 | 24 | | | | | | 571 | 559 |

Control Group:

Commercially available soda-lime glass was cut into glass plates each with 200 mm in length, 65 mm in width and 2 mm in thickness. The glass transition temperature Tg and the released from the press dies. The internal shape of the press dies resembles a part of a sphere with a radius of about 800 mm. Note that the pre-measured surface roughness Ra of the press dies was about 13 nm.

The glass plate, bent and formed as above, was transferred to an adjacent removal point while still placed on the supporting tool, naturally cooled to 440° C. (i.e., Ts−70° C.), removed at a predetermined position, and placed inside a distortion removing device. Note that, in this example, the bent glass plate was taken out just before being placed into the distortion removing device, and rapidly cooled to ambient temperature; thereafter, the upper surface roughness Ra and the maximum shape error against a predetermined spherical surface (800 mm in radius) were measured. Here, the maximum shape error is a PV value, which is a difference between the highest point (peak) and the lowest point (valley) in the measured range. The results were: Ra=9 nm and PV value=73 μm. Note that there were a plurality of small irregular features with large scales ranging from several millimeters to several centimeters, although they were not at a level to worsen the surface roughness, Ra value, and the PV value. Afterwards, the final bent glass plate was obtained by cutting off the peripheral portion, which is not part of the final product.

Embodiment Group 1

A glass plate with the same dimensions and composition as a sample in the control group and with its periphery polished was used. The glass plate was heated in a heating furnace with, the periphery being held horizontally by a ceramic supporting tool, the periphery not being part of a final product. A ceramic hot plate was used as a heat source of the heating furnace, wherein the ceramic hot plate has a size of 300 mm in length and 170 mm in width. The ceramic hot plate surface includes grooves, each having a generally semi-circular cross-sectional shape for holding a heating wire. One type of iron chromium heating wires is attached on the ceramic hot plate. Heating circuits were separately provided to apply different electric currents in an area of 200 mm in length and 70 mm in width in the center of the hot plate, and in a peripheral area of the hot plate with 50 mm in width, respectively.

A soaking plate made of reaction-sintered silicon carbide with 250 mm in length, 120 mm in width and 10 mm in thickness was provided between the hot plate being the heat source and the glass plate, so that the distance between, the soaking plate and the glass plate is equally 50 mm at any point of the glass plate, and so that the hot plate, the soaking plate and the glass plate are arranged vertically with respective long sides aligned in parallel with one another. Note that the flatness and the surface roughness Ra of the glass plate were 5 μm or less and about 5 nm, respectively.

Different electric currents were applied to the heating wires, so that the surface temperature of the center portion of the hot plate will reach 800° C., and the surface temperature of the peripheral portion of the hot plate will reach 1000° C. Just before the press molding, temperatures of the upper and lower press dies were 576° C. (Tg+16° C.) and 552° C. (Tg−8° C.), respectively. When the glass temperature reached about 590° C. (Tg+30° C.), the glass plate was transferred to between the pair of upper and lower press dies, quickly press-molded under a pressure of 500 kPa for 5 seconds, held under a reduced pressure of 200 kPa for 10 seconds, and released from the press dies. As in the control group, the internal shape of the press dies resembles a part of a sphere with a radius of about 800 mm. The pre-measured surface roughness Ra of the press dies was about 13 nm.

Again for this embodiment group, after being cooled down to 440° C., the bent glass plate was taken out just before being placed into the distortion removing device, and rapidly cooled to ambient temperature; thereafter, its upper surface roughness Ra and the maximum shape error with respect to the predetermined spherical surface (800 mm in radius) were measured. Here again, the maximum shape error is a FY value, which, is a difference between the highest point (peak) and the lowest point (valley) in the measured range. The results were: Ra=5 nm and PV value=43 μm. In addition, the irregular features with large scales ranging from several millimeters to several centimeters, which were observed in the control group, were seen only minimally, and the number and the degree of irregularities were both substantially reduced in any sample in this group. Afterwards, the final bent glass plate for optical use was obtained by cutting off the peripheral portion, which is not part of the final product.

Embodiment Group 2

A glass plate was formed using the similar method as above, and the shape precision and the surface roughness were evaluated. Note that no soaking plate was used for this embodiment group.

When the glass temperature reached about 580° C. (Tg+20° C.), the glass plate was transferred to between the pair of upper and lower press dies, quickly press-molded under a pressure of 100 kPa for 5 seconds, held under a reduced pressure of 50 kPa for 10 seconds, and released from the press dies. Just before the press molding, the temperatures of the upper and lower press dies were 569° C. (Tg+9° C.) and 557° C. (Tg−3° C.), respectively. The internal shape of the press dies resembles a part of a sphere with 800 mm in radius. The pre-measured surface roughness Ra of the press dies was about 13 nm.

As described above, the press-molded glass plate was transferred to an adjacent removal point while still placed on the supporting tool, cooled, removed at a predetermined position, and placed inside a distortion removing device, where its distortion is removed to yield a bent glass plate. Again, for this embodiment group, the molded bent glass article was taken out just before being placed into the distortion removing device, and cooled to ambient temperature; thereafter, the upper surface roughness Ra and the maximum shape error with respect to the predetermined spherical surface (800 mm in radius) were measured. Here, again, the maximum shape error is a PV value, which is a difference between the highest point (peak) and the lowest point (valley) in the measured range. The results were: Ra=4 nm and PV value=22 μm. The irregular features with large scales ranging from several millimeters to several centimeters, which were observed in the control group, were seen only minimally, similar to a sample in embodiment group 1. Afterwards, the final bent glass plate for optical use was obtained by cutting off the peripheral portion, which is not part of the final product.

Discussion on the Control Group and the Embodiment Groups:

The control group represents the case where the glass plate temperature is in the specified range but on a slightly high side (Tg+40° C.); the upper press die temperature is outside the specified range (Tg+30° C.); and the press pressure exceeds the specified range (1000 kPa). The bent glass surface roughness Ra was 9-10 nm, exceeding 5 nm, and the shape precision PV value was 57-74 μm, exceeding 50 μm.

The embodiment group 1 represents the case where the glass plate temperature is set to be 5° C. lower than that for the control group, and the upper press die temperature and the press pressure are within the respective specified ranges. As for the glass heating, the electric currents applied to the heating wires were adjusted to prevent a temperature decrease of the glass plate due to heat dissipation from the glass plate periphery. Also, the soaking plate was used to keep the temperature uniform across the glass plate. As a result, the surface roughness Ra values were obtained to be 5 nm or less, and the precision PV values were also substantially reduced to achieve 38-50 μm. In addition, the irregular features, such as those observed in the control group, were substantially reduced in this group. Although the cause of these irregular features is unclear at present. It is considered that this reduction was achieved owing to the uniform temperature across the glass plate by use of the soaking plate.

For the embodiment group 2, the electric currents applied to the heating wires were adjusted to prevent a temperature decrease in the glass plate periphery, but the soaking plate was not used. Further, the glass plate temperature was lowered by 15° C., and the upper press die temperature was lowered by 5° C. compared to those for the embodiment group 1, respectively. Furthermore, the press pressure was reduced to 100 kPa, resulting in the improvement represented by the surface roughness Ra values of 5 nm or less and the shape precision PV values of 20-34 μm.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination, may be directed to a subcombination or a variation of a subcombination.

What is claimed is:

1. A method of fabricating a bent glass plate for optical use by using a flat glass plate cut into predetermined dimensions, wherein the flat glass plate has a thickness of 2 mm or less and the bent glass plate has a curved shape over an entire surface without having a substantially flat portion, the method comprising steps of:
    (1) heating the flat glass plate to a temperature in a range from (Tg+20° C.) to (Tg+50° C.), wherein Tg is a glass transition temperature;
    (2) inserting the flat glass plate at a predetermined position between a pair of upper and lower press dies preheated to a temperature in a range from (Tg−50° C.) to (Tg+20° C.);
    (3) press-molding the flat glass plate inserted at the predetermined position between the press dies by applying a first press pressure in a range from 100 kPa to 500 kPa per unit area, and subsequently applying a second press pressure in a range from 10 kPa to 200 kPa per unit area, the second press pressure being from 40% to 50% of the first press pressure; and
    (4) releasing the press-molded glass plate from between the press dies and cooling the press-molded glass plate to a temperature of (T−70° C.) or lower under ambient conditions,
wherein Ts is a strain point of the flat glass plate,
    to produce the bent glass plate for optical use with a PV value of 50 μm or less and a Ra value of 5 nm or less, wherein the PV value represents shape precision and the Ra value represents surface roughness,
    a first time period during which the flat glass plate is press-molded with the first press pressure is 50% of a second time period during which the flat glass plate is press-molded with the second press pressure in the step (3) and
    a total time of the first time period and the second time period is in a range from 10 seconds to 30 seconds.

2. The method of claim 1, wherein the temperature to which the flat glass plate is heated is in a range from (Tg+20° C.) to (Tg+35° C.) in the step (1).

3. The method of claim 1, wherein the temperature to which the press dies are
preheated is in a range from (Tg 30° C.) to (Tg+20° C.) in the step (2).

4. The method of claim 1, wherein the first time period is 5 seconds and the second time period is 10 seconds.

* * * * *